(12) United States Patent
Xue

(10) Patent No.: US 12,476,836 B2
(45) Date of Patent: Nov. 18, 2025

(54) AUDIO AND VIDEO CONFERENCE IMPLEMENTATION METHOD, AUDIO AND VIDEO CONFERENCE SYSTEM, AND RELATED APPARATUS

(71) Applicant: TENCENT TECHNOLOGY (SHENZHEN) COMPANY LIMITED, Shenzhen (CN)

(72) Inventor: Di Xue, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 270 days.

(21) Appl. No.: 18/137,923

(22) Filed: Apr. 21, 2023

(65) Prior Publication Data

US 2023/0261892 A1 Aug. 17, 2023

Related U.S. Application Data

(63) Continuation of application No. PCT/CN2022/099302, filed on Jun. 17, 2022.

(30) Foreign Application Priority Data

Jul. 30, 2021 (CN) .......................... 202110875339.6

(51) Int. Cl.
*H04L 12/18* (2006.01)
(52) U.S. Cl.
CPC ................................ *H04L 12/1818* (2013.01)
(58) Field of Classification Search
CPC .................................................. H04L 12/1818
(Continued)

(56) References Cited

U.S. PATENT DOCUMENTS

2006/0104347 A1   5/2006   Callan et al.
2011/0093273 A1*  4/2011   Lee ..................... H04L 65/4038
                                               348/E7.083
(Continued)

FOREIGN PATENT DOCUMENTS

CN   103780402 A   5/2014
CN   108307198 A   7/2018
(Continued)

OTHER PUBLICATIONS

The State Intellectual Property Office of the People's Republic of China (SIPO) Office Action 1 for 202110875339.6 Mar. 27, 2024 9 Pages (including translation).

(Continued)

*Primary Examiner* — Binh Kien Tieu
(74) *Attorney, Agent, or Firm* — Anova Law Group, PLLC

(57) ABSTRACT

This application discloses a method for implementing audio and video conference, an audio and video conference system, and a related apparatus. The method includes receiving, by a retrieval device in a first device group, an application to pull data stream from a first interface machine in the first device group, the application to pull data stream comprising first identification information; and forwarding, by the retrieval device in the first device group, the media data stream corresponding to the first identification information to the first interface machine, the first interface machine forwarding the media data stream to the data accessing terminal; the media data stream being obtained by the retrieval device in the first device group from a second interface machine in a second device group, a data generating terminal that generates the media data stream accessing the conference room by using the second interface machine.

20 Claims, 11 Drawing Sheets

(58) Field of Classification Search
USPC ..................................................... 348/14.08
See application file for complete search history.

(56) References Cited

U.S. PATENT DOCUMENTS

| | | | | |
|---|---|---|---|---|
| 2011/0246608 A1* | 10/2011 | Wu | ....................... | H04L 67/104 |
| | | | | 709/217 |
| 2012/0154513 A1* | 6/2012 | Su | ............................ | G06F 3/01 |
| | | | | 348/E7.083 |
| 2016/0255126 A1 | 9/2016 | Sarris | | |
| 2017/0187966 A1* | 6/2017 | Oetting | ................... | H04N 7/15 |
| 2021/0082068 A1 | 3/2021 | O'Brien | | |
| 2022/0353096 A1* | 11/2022 | Smith | .................. | H04L 12/1818 |
| 2024/0291872 A1* | 8/2024 | Shahmeer | ............... | H04L 65/80 |

FOREIGN PATENT DOCUMENTS

| | | | |
|---|---|---|---|
| CN | 108833823 | A | 11/2018 |
| CN | 108924111 | A | 11/2018 |
| CN | 110113557 | A | 8/2019 |
| CN | 111447401 | A | 7/2020 |
| CN | 111787269 | A | 10/2020 |
| CN | 112087644 | A | 12/2020 |
| CN | 112422880 | A | 2/2021 |
| CN | 112995707 | A | 6/2021 |
| EP | 3595268 | A1 | 1/2020 |
| JP | 2003101979 | A | 4/2003 |
| JP | 2004179776 | A | 6/2004 |
| JP | 2015192230 | A | 11/2015 |
| JP | 2016181856 | A | 10/2016 |

OTHER PUBLICATIONS

The European Patent Office (EPO) The Extended European Search Report for 22848094.3 Jun. 17, 2024 7 Pages.

The World Intellectual Property Organization (WIPO) International Search Report for PCT/CN2022/099302 Aug. 31, 2022 12 Pages (including translation).

The Japan Patent Office (JPO) Notice of Reasons for Refusal for Application No. 2023-571700 Jan. 14, 2025 12 Pages (including translation).

* cited by examiner ions that are incorporated
AUDIO AND VIDEO CONFERENCE IMPLEMENTATION METHOD, AUDIO AND VIDEO CONFERENCE SYSTEM, AND RELATED APPARATUS

RELATED APPLICATIONS

This application is a continuation of PCT Application No. PCT/CN2022/099302, filed on Jun. 17, 2022, which claims priority to Chinese Patent Application No. 202110875339.6, entitled "AUDIO AND VIDEO CONFERENCE IMPLEMENTATION METHOD, AUDIO AND VIDEO CONFERENCE SYSTEM, AND RELATED APPARATUS" filed with the China National Intellectual Property Administration on Jul. 30, 2021. The two applications are incorporated herein by reference in their entirety.

FIELD OF THE TECHNOLOGY

This application relates to the computer field, and in particular, to a method for implementing audio and video conference, an audio and video conference system, and a related apparatus.

BACKGROUND OF THE DISCLOSURE

With rapid development of network technologies, communication technologies, and streaming media technologies, and the increasing mobility of people to work and learn, more and more enterprises and individuals need video communication, and audio and video conference systems emerge.

In a current audio and video conference, a conference architecture based on a selective forwarding unit (SFU) is often used, and the conference architecture includes one server and multiple terminals. After receiving an audio and video stream (that is, a media data stream) shared by a terminal in a conference room, the server directly forwards the audio and video stream to another terminal in the conference room.

However, once the number of people entering the conference room in this conference architecture is too large, pressure on data distribution of the server is greatly increased. Therefore, the quantity of people attending a conference is limited, and the number of people who can enable microphones or videos at the same time is limited. A participant needs to raise hand to speak. This requires redirection, and the user experience is not smooth.

SUMMARY

To resolve the foregoing technical problem, this application provides a method for implementing audio and video conference, an audio and video conference system, and a related apparatus, which greatly reduces pressure on data distribution of a media source device such as a second interface machine. Therefore, more participants can be supported, and even millions of participants can be supported. At the same time, because the pressure on data distribution during media data stream transmission is greatly reduced, all participants can simultaneously enable microphones or videos without redirection, and user experience is smooth.

Embodiments of this application disclose the following technical solutions:

One aspect of this application provides a method for implementing audio and video conference. The method includes receiving, by a retrieval device in a first device group, an application to pull data stream from a first interface machine in the first device group, the application to pull data stream comprising first identification information of a media data stream, the first device group being a device group in multiple device groups, a retrieval device existing in each device group, each device group comprising multiple interface machines, and each interface machine being configured to connect to a data accessing terminal that accesses a conference room by using the interface machine; the first interface machine being in the first device group; and forwarding, by the retrieval device in the first device group, the media data stream corresponding to the first identification information to the first interface machine, the first interface machine forwarding the media data stream to the data accessing terminal; the media data stream being obtained by the retrieval device in the first device group from a second interface machine in a second device group, a data generating terminal that generates the media data stream accessing the conference room by using the second interface machine, and the second device group being a device group in the multiple device groups.

Another aspect of this application provides an audio and video conference system. The system includes a data transmission network and a room management subsystem, with the data transmission network being configured to transmit a media data stream generated in a conference room, the data transmission network comprising multiple device groups, and each device group comprising multiple interface machines; each of the multiple interface machines being configured to connect to a conference accessing terminal, the conference access terminal accessing the conference room by using the interface machine. The system further includes a retrieval device existing in each device group in the multiple device groups, a retrieval device in a first device group being configured to receive an application to pull data stream from a first interface machine in the first device group, the application to pull data stream comprising first identification information of a media data stream, and forward the media data stream corresponding to the first identification information to the first interface machine, the media data stream being obtained by the retrieval device in the first device group from a second interface machine in a second device group, a data generating terminal that generates the media data stream accessing the conference room by using the second interface machine, and the first device group and the second device group each being any one of the multiple device groups; the first interface machine being any interface machine in the first device group, and the first interface machine being configured to forward the media data stream to a corresponding conference access terminal; and the room management subsystem comprising the multiple device groups and a central server, each device group comprising an intra-group server, and the intra-group server being configured to assist the central server in managing the conference room.

Another aspect of this application provides a non-transitory computer readable storage medium, where the computer readable storage medium is configured to store program code, and when the program code runs on an electronic device, the electronic device performs the method according to the first aspect.

This application relates to multiple device groups, each device group includes multiple interface machines, and each interface machine of the multiple interface machines is configured to connect to a conference access terminal, so that the conference access terminal accesses a conference room by using the interface machine. Compared with a case in which multiple conference access terminals access a conference room by using one server in, roles of the multiple interface machines are similar to that of the server, and conference access terminals are distributed to different interface machines, and load is shared by multiple interface machines, so that more conference access terminals can be accessed, and a large-scale conference is supported.

A retrieval device exists in each device group in the multiple device groups, and a media data stream is generated by accessing a conference room by using a second interface machine. After receiving an application to pull data stream of a first interface machine in a first device group, because the application to pull data stream includes first identification information of a media data stream, a retrieval device in each device group, such as the first device group, can forward the media data stream corresponding to the first identification information to the first interface machine, so that the first interface machine is configured to forward the media data stream to a corresponding conference access terminal. In this way, when each interface machine needs to pull a media data stream of the second interface machine, only the second interface machine needs to interact with a retrieval device in each device group, so that the retrieval device shares pressure on data distribution for a media source device, such as the second interface machine, and interacts with another interface machine, and no interaction is required between the second interface machine and each interface machine, which greatly reduces pressure on data distribution of the device, such as the second interface machine. Therefore, the method for implementing audio and video conference can support more participants and even millions of participants. In addition, because pressure on data distribution during media data streaming is greatly reduced, all participants (that is, users) can simultaneously enable microphones or videos without redirection, and the user experience is smooth.

BRIEF DESCRIPTION OF THE DRAWINGS

To describe technical solutions in embodiments of this application or the related art more clearly, the following briefly introduces the accompanying drawings required for describing the embodiments or the related art. Apparently, the accompanying drawings in the following description show only some embodiments of this application, and a person of ordinary skill in the art may still derive other drawings from these accompanying drawings without creative efforts.

DESCRIPTION OF EMBODIMENTS

The following describes the embodiments of this application with reference to the accompanying drawings.

Figure 1:
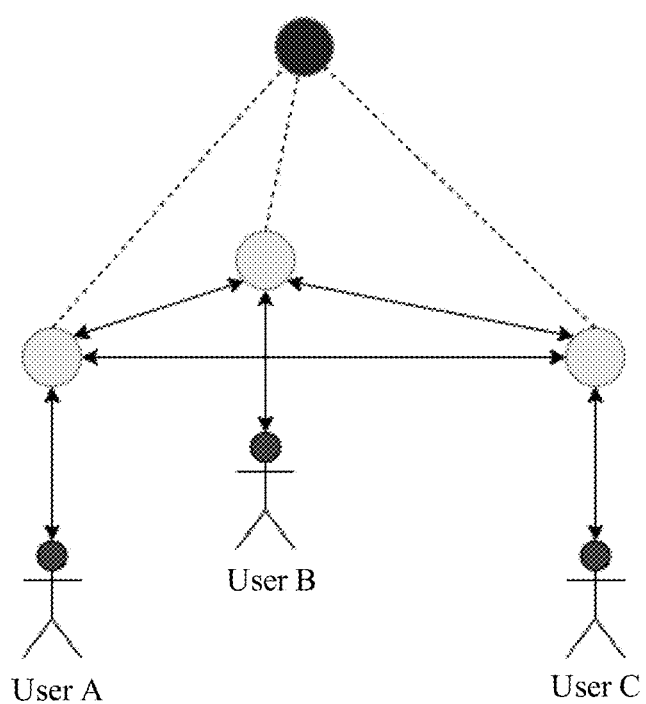
FIG. 1 is a diagram of an SFU-based conference architecture according to a related art.

Currently, an SFU-based conference architecture is mainly used for audio and video conference. Referring to FIG. 1, in the figure, a black node is a server, a gray node is a terminal, multiple terminals are connected to the server, and a user A, a user B, and a user C separately access a conference room to participate in a conference by using corresponding terminals.

However, once the quantity of people entering the conference room in this conference architecture is too large, pressure on data distribution of the server is greatly increased. Therefore, in this conference architecture, the number of people attending a conference is limited, and the quantity of people who can enable microphones or videos at the same time is limited. An ordinary audience needs to hand up for speaking. This requires redirection, and the user experience is not smooth.

In addition, participants in this manner cannot simultaneously enable videos or microphones. Therefore, on a basis of the SFU architecture shown in FIG. 1, a diffusion agent is added (as shown by a node included in a dashed line box in FIG. 2), a user who does not speak is placed on the diffusion agent, and the user is redirected to a communication node (as shown by a node included in a solid line box in FIG. 2) when handing up for speaking, a quantity of participants in a conference is increased by using a distribution advantage of the diffusion agent. In this method, redirection is required, and the user experience is not smooth.

To resolve the foregoing technical problem, an embodiment of this application provides a method for implementing audio and video conference. In the method, when each interface machine needs to pull a media data stream of a second interface machine, only the second interface machine needs to interact with a retrieval device in each device group, so that the retrieval device shares pressure on data distribution for a second interface machine and interacts with another interface machine, and no interaction is required between the second interface machine and each interface machine, which greatly reduces pressure on data distribution of a media source device such as the second interface machine. Therefore, the method for implementing audio and video conference can support more participants and even millions of participants. In addition, because the pressure on data distribution during media data streaming is greatly reduced, all participants can simultaneously enable microphones or videos without redirection, and the user experience is smooth.

The method for implementing audio and video conference provided in one embodiment may be applied to various audio and video conference scenarios, in particular, a superlarge-scale video and audio conference used for a single meeting of millions of people.

The following describes the architecture of an audio and video conference system according to an embodiment of this application. When participants enter a conference room to participate in a conference based on an audio and video conference system, the participants mainly include a guest who needs to enable audio and video, and an ordinary audience. When the guest enables audio and video, a media data stream is generated, and the media data stream is transmitted to a conference access terminal corresponding to the general audience, and a conference access terminal corresponding to another guest. The conference access terminal is a terminal used for accessing the conference room, and the conference access terminal may be a user terminal. Therefore, the audio and video conference mainly lies in that a participant enables transmission of a media data stream when the audio and video are enabled, for example, a video or a microphone is enabled. When transmission of the media data stream is not limited by the quantity of participants in a conference room, the audio and video conference system may support a large-scale conference. Therefore, one embodiment focuses on improvement of a data transmission network architecture.

Figure 3:
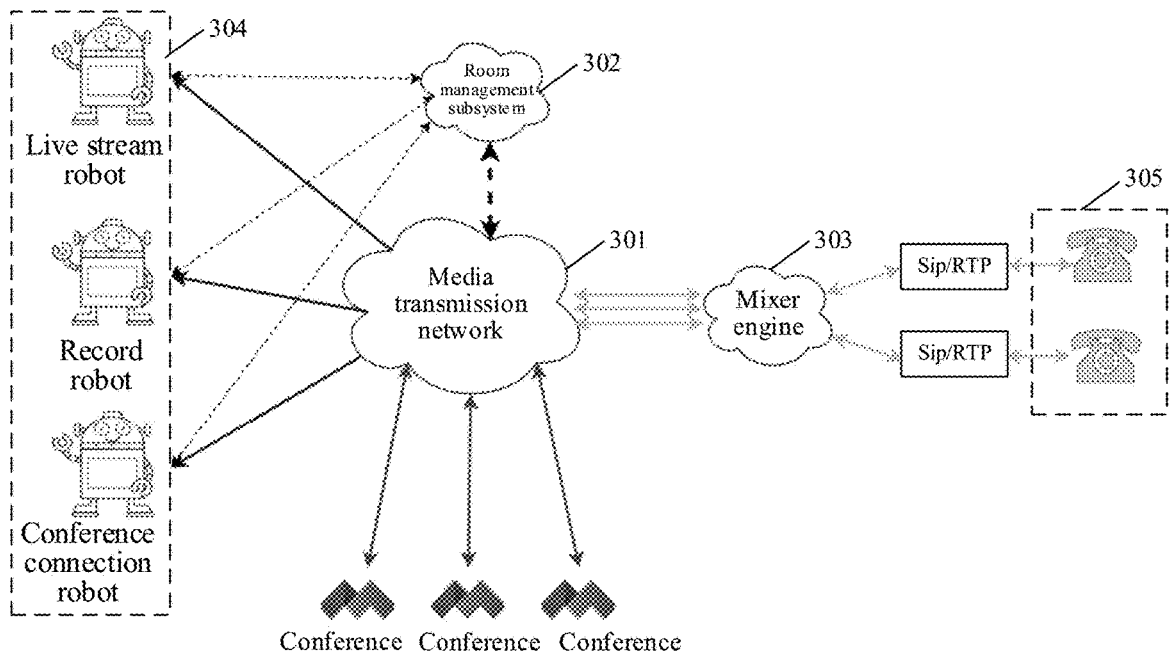
FIG. 3 is a structural diagram of an audio and video conference system according to related technology.

In addition, because each conference corresponds to one conference room for storing room information, a participant list, and maintaining a user status (enabling or disabling audio and video, i.e., enabling or disabling the microphone, enabling or disabling the video, mute, or entering or exiting the room). In the case of a super-large-scale conference, everyone keeps enabling or disabling the video or entering or exiting the room, resulting in a large quantity of notification messages that reflect status changes. Pulling and synchronization of a participant list of the super-large audio and video conference will also exert great pressure on a room management subsystem. Therefore, improvements to the room management subsystem in one embodiment also enable the audio and video conference system to support a super-large-scale audio and video conference. Therefore, as shown in FIG. 3, the architecture of the audio and video conference system in this embodiment mainly includes a data transmission network 301 and a room management subsystem 302. The data transmission network 301 is configured to transmit a media data stream generated in a conference room, and the room management subsystem 302 is configured to manage the conference room.

Figure 4A:
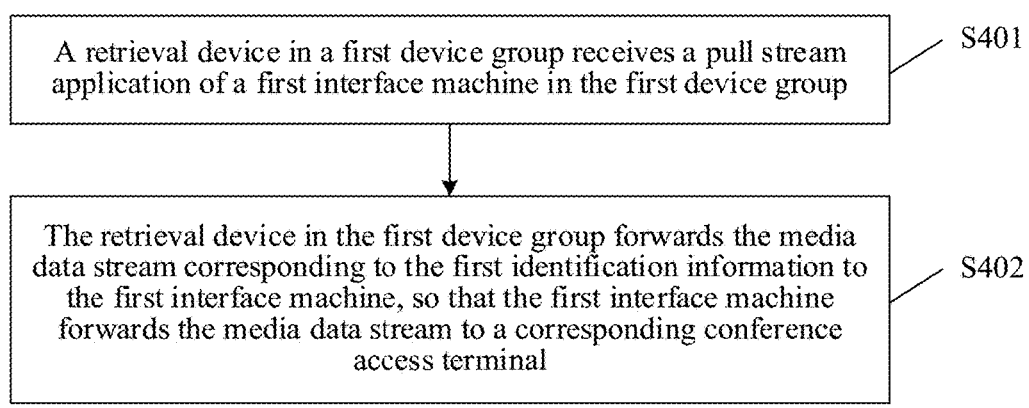
FIG. 4a is a flowchart of a method for implementing audio and video conference according to an embodiment of this application.

In one embodiment, a method for implementing audio and video conference is first described from a perspective of the data transmission network 301 for transmitting a media data stream. Referring to FIG. 4*a*, the method includes the following steps:

S401. A retrieval device in a first device group receives an application to pull data stream from a first interface machine in the first device group.

Figure 4B:
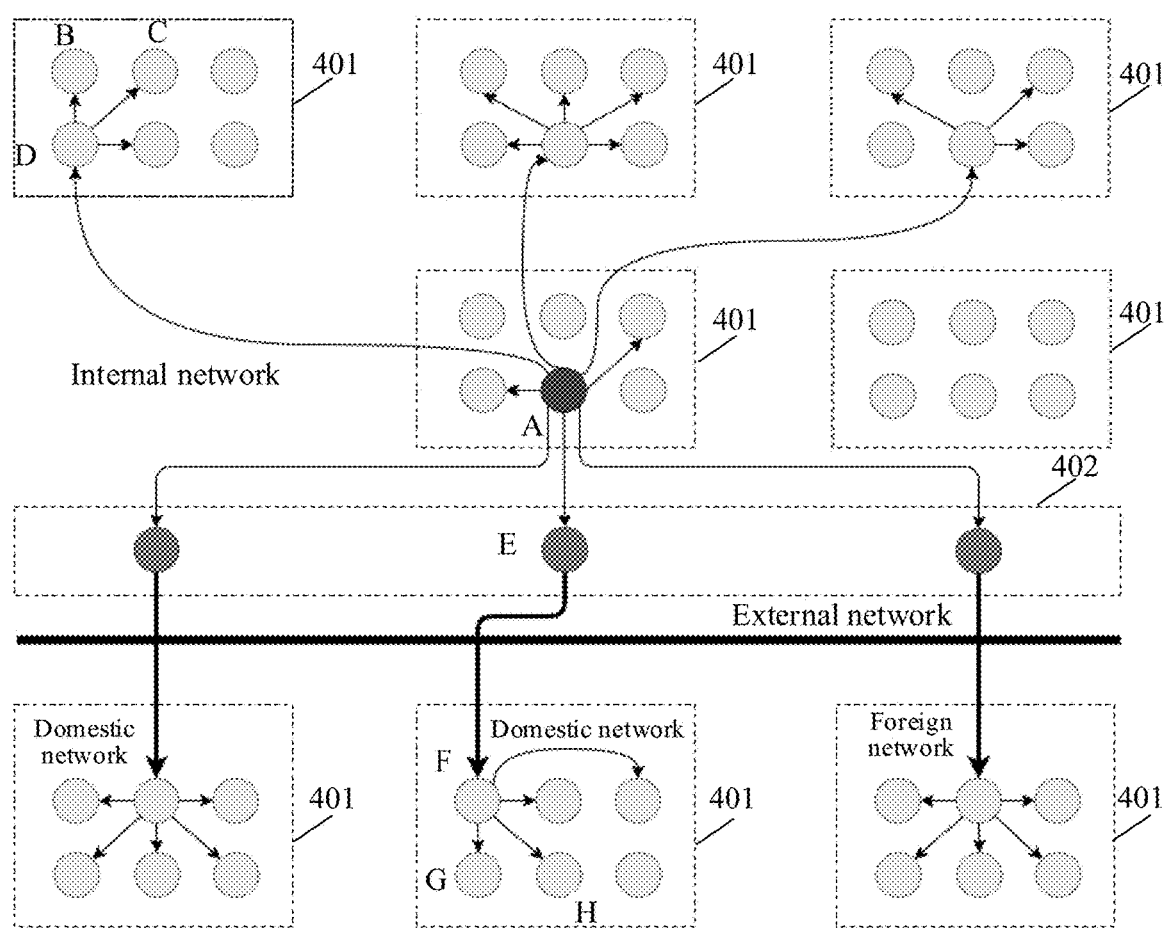
FIG. 4b is a structural diagram of a data transmission network according to an embodiment of this application.

The data transmission network 301 may be shown in FIG. 4*b*, and includes multiple device groups 401, for example, shown in each dashed line box in FIG. 4*b*. Each device group 401 includes multiple interface machines, and each interface machine is, for example, a node represented by a circle in the device group 401 in FIG. 4*b*. Each of the multiple interface machines is configured to connect to a conference access terminal, so that the conference access terminal accesses a conference room by using the interface machine, so that a participant corresponding to the conference access terminal can enter the conference room to participate in the conference. The device group may be represented by SET, that is, multiple interface machines are divided by SET, and the interface machine may be a server. A retrieval device exists in each of the plurality of device groups 401.

The first device group may be any device group in the multiple device groups, and the first interface machine may be any interface machine in the first device group.

When a media data stream needs to be pulled by an interface machine (for example, the first interface machine) in a device group (for example, the first device group), the first interface machine may send an application to pull data stream to the retrieval device in the first device group. The application to pull data stream may include first identification information of a media data stream, and the first identification information identifies a media data stream of media data subscribed to by the application to pull data stream, so that the retrieval device knows which media data stream to pull. The first interface machine may be an interface machine connected to a conference access terminal corresponding to a user who subscribes to media data. That is, if a user on the first interface machine subscribes to media data of an interface machine, the first interface machine is triggered to send an application to pull data stream to the retrieval device in the first device group.

S402. The retrieval device in the first device group forwards the media data stream corresponding to the first identification information to the first interface machine, so that the first interface machine forwards the media data stream to a corresponding conference access terminal.

After receiving the application to pull data stream, the retrieval device in the first device group forwards the media data stream corresponding to the first identification information to the first interface machine, and then the first interface machine forwards the media data stream to the corresponding conference access terminal. The conference access terminal that generates the media data stream accesses the conference room by using a second interface machine, and the second device group is any device group in the multiple device groups.

The second interface machine may be an interface machine connected to a conference access terminal corresponding to a user whose audio and video are enabled. For example, when a user, for example, a second user, enables video on a conference access terminal of the user, the conference access terminal corresponding to the second user accesses the conference by using the second interface machine, and the second interface machine is located in the second device group. If any user participating in the conference, for example, a first user wishes to watch the video of the second user (for example, subscribed to the video of the second user), the first interface machine connected to the conference access terminal corresponding to the first user may find a retrieval device in a device group in which the first interface machine is located, for example, the first device group, and send an application to pull data stream to the retrieval device in the first device group, so that the retrieval device forwards, according to the application to pull data stream, a media data stream obtained from the second interface machine to the first interface machine, and the first interface machine forwards the media data stream to the corresponding conference access terminal. The user in one embodiment may be a participant.

The media data stream on the retrieval device is pulled from the second interface machine, and the pulled media data stream may be stored locally on the retrieval device. That is, generally, when receiving, for the first time, the application to pull data stream for pulling the media data stream, the retrieval device does not save the media data stream locally, and therefore needs to pull the media data stream from the second interface. If another interface machine has previously applied for the media data stream, the media data stream is locally saved, and the media data stream does not need to be pulled from the second interface machine.

Therefore, in this embodiment, different methods of media data stream pull may be used according to whether the retrieval device in the first device group locally finds the media data stream.

In one embodiment, a specific method in which the retrieval device in the first device group forwards the media data stream corresponding to the first identification information to the first interface machine may be that the retrieval device in the first device group receives the application to pull data stream sent by the first interface machine, searches for the media data stream of the corresponding second interface machine according to the first identification information, if the media data stream of the second interface machine is not found, forwards the application to pull data stream to the second interface machine, receives the media data stream forwarded by the second interface machine according to the first identification information in the application to pull data stream, and forwards the media data stream to the first interface machine.

It may be understood that if the application to pull data stream is sent when the first user subscribes to the video of the second user, after receiving the application to pull data stream, the second interface machine may locally record that the retrieval device subscribes to the second interface machine, and then the second interface machine sends the media data stream to the retrieval device. The retrieval device also stores the received media data stream locally, so that when another interface machine requests the media data stream, the retrieval device does not need to interact with the second interface machine, and may directly return the media data stream to the first interface machine.

For example, as shown in FIG. 4b, a node A may be used as the second interface machine, and the second interface machine is used as an interface machine on which a guest is located, that is, a user corresponding to a conference access terminal on the second interface machine may enable the video and has an uplink video data stream. In this case, the video data stream is used as a media data stream. Node B may be used as the first interface machine, and node D may be used as a retrieval device of a device group such as the first device group in which the node B is located. A user on node B subscribes to the uplink video data stream of the node A. The node B first finds the node D in the first device group, and sends an application to pull data stream to the node D. After receiving the application to pull data stream of the node B, the node D first locally searches for the media data stream of the node A. If not found, the node D initiates an application to pull data stream to the node A. After receiving the application to pull data stream from the node D, the node A locally records that the node D subscribes to the node A, and then forwards the video data stream to the node D. The node D receives the video data stream and forwards the video data stream to node B. Node B finally sends the video data stream to a corresponding conference access terminal.

When the retrieval device in the first device group searches for the media data stream of the second interface machine according to the first identification information, if the media data stream of the second interface machine is found, the retrieval device directly forwards the found media data stream to the first interface machine. In this method, pull efficiency of a media data stream can be improved, and pressure on data distribution of a media source device such as the second interface machine is further reduced.

For example, as shown in FIG. 4b, a node A may be used as the second interface machine, and the second interface machine is used as an interface machine on which a guest is located, that is, a user corresponding to a conference access terminal on the second interface machine may enable the video and has an uplink video data stream. In this case, the video data stream is used as a media data stream. The node C may be used as the first interface machine, and the node D may be used as a retrieval device of a device group such as the first device group in which the node C is located. A user on node C subscribes to the uplink video data stream of the node A. The node C first finds the node D in the first device group, and sends an application to pull data stream to the node D. The node B and the node C in the same device group find the same node D by using a consistent hash or another method, and send an application to pull data stream to the node D. The node D finds that the video data stream already exists locally (previously applied for by the node B). The node D directly forwards the found video data to the node C, and the node C receives the forwarded video data stream from the node D, and finally forwards the video data stream to a corresponding conference access terminal.

It may be understood that the retrieval device in the first device group is an interface machine that needs to apply for a media data stream, for example, the first interface machine, and is determined according to a preset rule, and the preset rule causes the same media data stream to be routed, by using the same retrieval device, to an interface machine in a device group in which the retrieval device is located. For example, the node B and the node C in the same device group both find the same node D by using a consistent hash or another method. This facilitates unified distribution management on the same media data stream in the same device group.

The first device group and the second device group may be located in the same local area network (that is, an internal network), or may be located in different local areas (that is, an external network, including a domestic network and an external network of a network abroad). If the first device group and the second device group are located in the same local area network, the retrieval device in the first device group directly forwards the application to pull data stream to the second interface machine, and the second interface machine directly sends the media data stream to the retrieval device. If the first device group and the second device group are located in different local area networks, the data transmission network 301 further includes a transit agent device 402, for example, a device shown as 402 in FIG. 4b. The retrieval device in the first device group needs to forward the application to pull data stream to the second interface machine by using the transit agent device 402. Correspondingly, the second interface machine forwards the media data stream to the retrieval device in the first device group by using the transit agent device 402.

For example, as shown in FIG. 4b, a node A may be used as the second interface machine, and the second interface machine is used as an interface machine on which a guest is located, that is, a user corresponding to a conference access terminal on the second interface machine may enable the video and has an uplink video data stream. In this case, the video data stream is used as a media data stream. Node G may be used as the first interface machine, and a node F may be used as a retrieval device of a device group such as the first device group in which the node G is located. In this case, the first device group in which the node G is located and the second device group in which the node A is located are not in the same local area network, that is, the node G is an edge node. A user on the node G subscribes to the video data stream upstream of the node A (the video data stream is used as a media data stream), and the path of obtaining the video data stream is relatively long. The node G first finds the node F in the first device group, and sends an application to pull data stream to the node F. After receiving the application to pull data stream from the node G, the node F first locally searches for the video data stream of the node A. If not found, the node F initiates an application to pull data stream to the node A by using the transit agent device 402 (for example, a node E in FIG. 4*b*). The node A receives the application to pull data stream from the node F, locally records that the node F subscribes to the node A, and then forwards the video data stream to the node F by using the node E, and then the node E forwards the video data stream to the node G. Finally, the node G forwards the video data stream to a corresponding conference access terminal.

A process in which a node H pulls the video data stream of the node A in FIG. 4*b* is similar to that of the node C, but the node E also needs to be used in the middle. Details are not described herein again. In this process, search of the transit agent device 402, for example, the node E, may be preconfigured, or may be dynamically allocated, which is not limited herein. Structurally, in one embodiment, interface machines used for accessing an audio and video conference are divided by device group (SET). When an interface machine in a device group needs to pull a media data stream, a retrieval device may be determined in the device group in which the interface machine is located, and then the retrieval device initiates an application to pull data stream to an interface machine (that is, a media source device) that generates a media data stream. This design greatly reduces pressure on data distribution of the media source device, and greatly increases a quantity of participants in a conference room. For example, it is assumed that each SET has 100 interface machines, and the whole audio and video conference system has 100 SETs. Each 8-core 16G interface machine can support forwarding of 100 media data streams. If only one guest exists in a conference, and the rest of the conference are audiences, the maximum size of the conference is 100 (machine)*100 (SET)*100 (distribution)=1,000,000 people. If there is more than one guest, different interface machines of different SETs will be distributed based on the principle of proximity access. An uplink forwarding load will also be distributed, and a conference with millions of people will be easily supported.

It can be learned from the foregoing technical solutions that this application relates to multiple device groups, each device group includes multiple interface machines, and each interface machine of the multiple interface machines is configured to connect to a conference access terminal, so that the conference access terminal accesses a conference room by using the interface machine. Compared with a case in which multiple conference access terminals access a conference room by using one server, roles of the multiple interface machines are similar to that of the server, and conference access terminals are distributed to different interface machines, and load is shared by multiple interface machines, so that more conference access terminals can be accessed, and a large-scale conference is supported. A retrieval device exists in each device group in the multiple device groups, and a media data stream is generated by accessing a conference room by using a second interface machine. After receiving an application to pull data stream from a first interface machine in a first device group, because the application to pull data stream includes first identification information of a media data stream, a retrieval device in each device group, such as the first device group, can forward the media data stream corresponding to the first identification information to the first interface machine, so that the first interface machine is configured to forward the media data stream to a corresponding conference access terminal. In this way, when each interface machine needs to pull a media data stream of the second interface machine, only the second interface machine needs to interact with a retrieval device in each device group, so that the retrieval device shares pressure on data distribution for a media source device, such as the second interface machine, and interacts with another interface machine, and no interaction is required between the second interface machine and each interface machine, which greatly reduces pressure on data distribution of the device, such as the second interface machine. Therefore, the method for implementing audio and video conference can support more participants and even millions of participants. In addition, because pressure on data distribution during media data streaming is greatly reduced, all participants (that is, users) can simultaneously enable microphones or videos without redirection, and the user experience is smooth.

Compared with a conference architecture based on a multipoint control unit (MCU), operation and maintenance are simple, and are not limited by performance and hardware price. Therefore, the quantity of actual supported people is greatly increased, and a super-large-scale conference is implemented.

Figure 5:
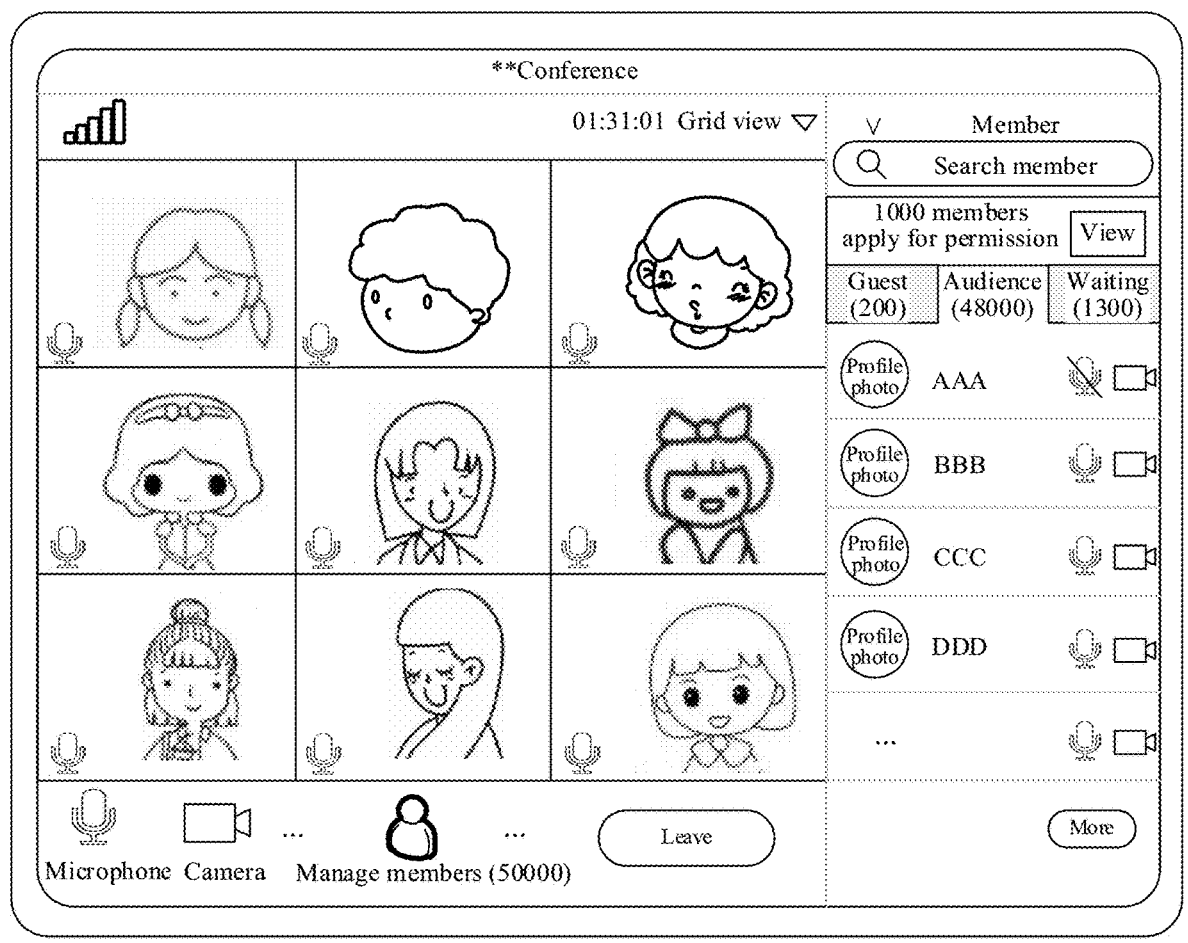
FIG. 5 is an interface diagram of performing a video conference based on an audio and video conference system according to an embodiment of this application.

For an interface diagram of a video conference performed based on the method for implementing audio and video conference and the audio and video conference system provided in one embodiment, references may be made to FIG. 5. An image of a participant who enables the video, a participant list, an icon of a related function key (for example, a microphone icon, a camera icon, an administrator icon, and an icon indicating leaving a conference) may be displayed on the interface, and the icon of the microphone may be displayed with a slash for a participant who does not enable the microphone. In the audio and video conference system provided in one embodiment, a super-large-scale conference is implemented. For example, the maximum number of people entering the conference may be 50000, that is, 50000 management members.

Next, in one embodiment, the method for implementing audio and video conference is described from a perspective of the room management subsystem 302 in managing a conference room.

Figure 6:
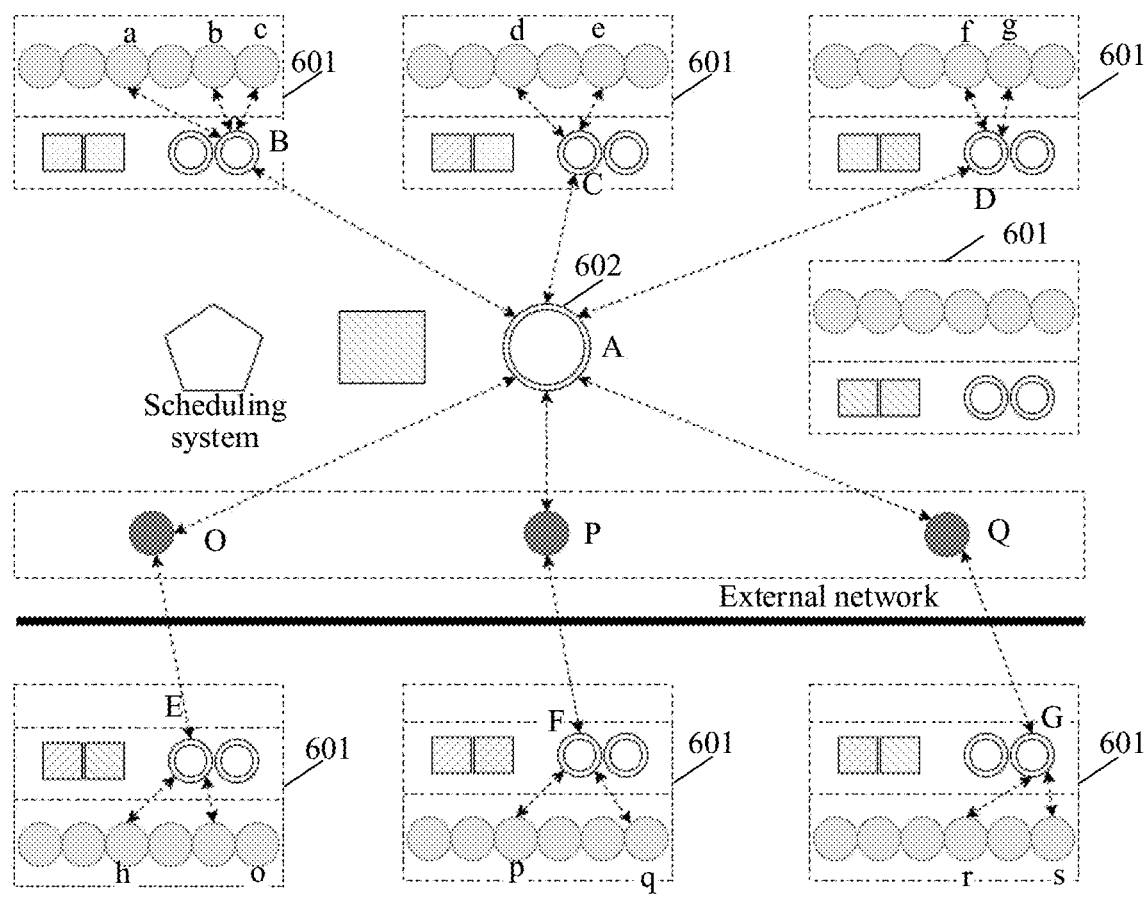
FIG. 6 is a structural diagram of a room management subsystem according to an embodiment of this application.

Referring to FIG. 6, room management subsystem 302 may include the foregoing multiple device groups 601 and a central server (RoomSvc) 602. The central server 601 herein also includes the foregoing multiple interface machines, which are similar to the device group shown in FIG. 4*b*. In addition, each device group 601 further includes an intra-group server (RoomSvcInSet), and the intra-group server is configured to assist the central server 602 in managing a conference room. The intra-group server is shown in a circle in each device group 601 in FIG. 6, for example, a node B, a node C, a node D, a node E, a node F, and a node G in FIG. 6. The central server 602 is, for example, the node A in FIG. 6.

In this embodiment, an intra-group server and a retrieval device in the same device group may be the same device, or may be different devices. This is not limited to this embodiment.

Managing the conference room mainly includes managing room information of the conference room, a notification message of a status change, and pull of a participant list. The room information includes, for example, the name of the conference room, a creation time, a participant, and a conference time.

In one embodiment, a room management system is divided into a central server and an intra-group server. There is only one central server, and the intra-group server and the interface machine are deployed by SET, so that synchronization of a notification message and pull of a participant list can be realized by using the intra-group server to release management pressure of the central server, thereby implementing a super-large-scale conference.

In the device group, for the same conference room, all interface machines register the same RoomSvcInSet by using a certain algorithm, and maintain a long connection through a heartbeat before a media data stream can be pulled in the conference room. When there is a notification message in the conference room to be synchronized (such as a status change of a user: enter the conference room to attend the conference, exit the conference room, enable or disable the microphone, enable or disable the video), or the participant list needs to be pulled, those are done through this RoomSvcInSet.

First, a registration flow of entering a conference room to attend the conference is described. When any interface machine such as a third interface machine in any device group such as a third device group requests to enter the conference room, an intra-group server in the third device group receives a registration request sent by the third interface machine, where the registration request may include a room identifier used for indicating a conference room that needs to be entered. If the intra-group server in the third device group does not locally find information about the conference room, the intra-group server sends the registration request to the central server. The central server records second identification information of the intra-group server in the third device group to a first conference registration list, and returns registration success information to the intra-group server in the third device group. The intra-group server in the third device group records third identification information of the third interface machine into second conference registration list, and returns registration success information to the third interface machine to complete registration of the third interface machine. Both the second identification information and the third identification information are identification information, and are unique identifiers of corresponding devices. The identification information may be, for example, an address. That is, the second identification information may be an address of the intra-group server, and the third identification information may be an address of the third interface machine. The third device group is any device group in multiple device groups, the third interface machine is any interface machine in the third device group, the third device group may be the first device group or the second device group in the foregoing embodiment, and the third interface machine may be the first interface machine or the second interface machine in the foregoing embodiment.

For example, as shown in FIG. 6, a node a may be used as the third interface machine, and the third interface machine is an interface machine that wants to register for a conference, that is, a user corresponding to a conference access terminal on the third interface machine wants to enter a conference room to attend the conference. Node A may be used as the central server, and node B may be used as the intra-group server of a device group in which the third interface machine is located, for example, the third device group. The node B may be determined by the node a according to a rule (consistent hash or allocation scheduling). The node a sends a registration request to the node B. After receiving the registration request from the node a, node B searches for RoomSvc corresponding to the conference, that is, the node A. Node B sends a registration request to the node A. The node A receives the registration request sent by the node B, records an address of the node B in the registration list of the conference (the first conference registration list saved on the node A), and returns registration success information to the node B. After receiving the registration success information returned by the node A, the node B records an address of the node a in the registration list of the conference (the second conference registration list saved in the node B), and returns registration success information to the node a.

It may be understood that in this embodiment, after the registration succeeds, the intra-group server and the central server, the intra-group server and the registered interface machine, such as the third interface machine, can maintain a long connection, to facilitate subsequent interaction between the two. For example, the node B may also periodically send a heartbeat to the node A, and keep a long connection channel with the node A. After receiving the registration success information returned by node B, the node a periodically sends a heartbeat, and keeps a long connection channel with the node B.

If the intra-group server in the third device group locally searches for information about the conference room according to the registration request, and locally finds the information about the conference room, the intra-group server may record the third identification information of the third interface machine in the second conference registration list, and return registration success information to the third interface machine.

For example, as shown in FIG. 6, a node b may be used as the third interface machine, and the third interface machine is an interface machine that wants to register for a conference, that is, a user corresponding to a conference access terminal on the third interface machine wants to enter a conference room to attend the conference. Node A may be used as the central server, and node B may be used as the intra-group server of a device group in which the third interface machine is located, for example, the third device group. The node B may be determined by the node b according to a rule (consistent hash or allocation scheduling). Node b sends a registration request to node B. The node b receives the registration request from the node b, finds that information about the conference room exists locally, records an address of the node b in the registration list of the conference (the second conference registration list saved on the node B), and returns registration success information to the node b. After receiving the registration success information returned by node B, the node b periodically sends a heartbeat and keeps a long connection channel with the node B.

Similarly, when a user located on an edge node (that is, the device group and the central server are not in the same local area network, and the interface machine in the device group and the central server are not in the same local area network) registers in the same conference room, the registration process needs to be forwarded through a transit agent device such as a node O, a node P, and a node Q in FIG. 6. The rest of the process is similar.

When a status change occurs in a conference access terminal that accesses a conference room, for example, when the user enables or disables audio and video, the user needs to notify another user in the conference room of the status change of enabling or disabling the audio and video. For example, a conference access terminal whose status changes is located in the third interface machine in the third device group. In this case, the intra-group server in the third device group receives a notification message sent by the third interface, and sends the notification message to the central server. The central server sends the notification message to an intra-group server of each device group, and the intra-group server of each device group sends the notification message to a successfully registered interface machine.

Still using FIG. 6 as an example, the node a may be used as the third interface machine, the node a is an interface machine in which a guest is located, the node A may be used as the central server, and the node B may be used as the intra-group server in the device group such as the third device group in which the third interface machine is located. If the guest on the node a enables the video, that is, a status change occurs, the node a sends a notification message (msg-a-openvideo) indicating the status change to node B, and the node B sends the notification message to the node A. The node A traverses a local registration list (the first conference registration list stored in the node A), and sends the notification message to all intra-group servers, for example, the node B, the node C, the node D, the node E, the node F, and the node G in FIG. 6. The node B, the node C, the node D, the node E, the node F, and the node G receive the notification message, traverse the local registration list (each serving as the second conference registration list stored in the intra-group server), and send the notification message to all interface machines, for example, the node a, the node b, a node c, a node d, a node e, a node f, a node g, a node o, a node p, a node q, a node r, and a node s in FIG. 6.

A participant list is maintained in an audio and video conference, and the participant list includes all participants. In the super-large-scale audio and video conference implemented by the audio and video conference system provided in one embodiment, there are a large quantity of participants, and a pull by page manner may be used for updating the local participant list. When an interface machine such as the third interface machine in a device group, for example, the third device group, requests to pull the participant list, the intra-group server in the third device group receives a list pull request from the third interface machine, and the intra-group server in the third device group locally searches for the participant list. If the intra-group server in the third device group does not locally find the participant list, the intra-group server sends the list pull request to the central server. The intra-group server in the third device group receives the participant list sent by the central server, and sends the participant list to the third interface machine.

For example, as shown in FIG. 6, if the node a is used as the third interface machine, a user on the node a requests the participant list from the node B, and the node B searches for the list in a local cache. If not found, node B initiates a list pull request to the node A. After receiving the list pull request, node A returns the corresponding participant list to the node B. After caching the participant list locally, the node B returns the participant list to the node a. The participant list may be a full participant list, or may be a page-by-page participant list such as Page1.

When the intra-group server in the third device group locally searches for the participant list, if the intra-group server in the third device group locally finds the participant list, and the participant list does not expire, the intra-group server returns the participant list to the third interface machine.

In the previous example, if the node b shown in FIG. 6 is used as the third interface machine, if another node already requested the foregoing participant list Page1 before the node b, in this case, the participant list already exists on the node B, and therefore the participant list does not need to be requested from the node A. Therefore, the node a sends a list pull request to the node B. Node B finds Page1 in a local cache and Page1 does not expire, and the node B directly returns Page1 to the node b.

Next, a disaster recovery process is described. Because all information of RoomSvc comes from RoomSvcInSet and the interface machine, automatic reconstruction can be conveniently performed through RoomSvcInSet after RoomSvc is down. Similarly, all data of RoomSvcInSet comes from the interface machine. When RoomSvcInSet is down, automatic reconstruction can be performed through the interface machine in the device group (SET).

According to the method for implementing audio and video conference provided in one embodiment, management pressure of the central server is relieved by using the intra-group server to implement a super-large-scale conference.

An SFU-based audio and video conference provided requires audio routing based on energy values when transmitting media data streams generated in conference rooms, such as audio data streams. In this method, a delay generated in a long-distance call greatly affects experience. When there is a relatively large quantity of participants, a large quantity of bandwidth is wasted, and a network performance loss of a conference access terminal is increased. In addition, in a scenario that requires interactive voice response (IVR) and precise recording in a conference, precise control is not easy to be performed under SFU transformation (for example, determining of start and end, by using signaling or by using a media data stream). In addition, in the case of voice recording, some industries with strict requirements cannot accept the case where more or fewer words are recorded in the recording process. If there is no centralized audio processing service, it is easy to record the content that is not to be recorded or not to record the content that needs to be recorded. These cases are absolutely unacceptable to more demanding users.

Therefore, as shown in FIG. 3, the audio and video conference system provided in one embodiment further includes a mixer engine 303. The mixer engine 303 is located between the media transmission network 301 and a public switched telephone network (PSTN) 305, and serves as a bridge for communication between the two, thereby greatly improving conference experience in a super-large-scale room. The mixer engine 303 connects to the public switched telephone network 305 by using a protocol such as the Session Initiation Protocol (SIP) or the Real-Time Transport Protocol (RTP).

The mixer engine 303 includes a mixer and a selector, and each device group has a corresponding mixer engine. When a media data stream is an audio data stream, the selector in the mixer engine sends acquired multiple audio data streams to a mixer located in the same device group for sending, and the multiple audio data streams respectively come from fourth interface machines in different device groups. The mixer selects a target audio data stream from the multiple audio data streams, and sends a selection notification to a target interface machine connected to a conference access terminal that generates the target audio data stream. The target interface machine sends the target audio data stream to the mixer, the mixer mixes the target audio data stream, and forwards the mixed audio data stream to a selector corresponding to the fourth interface machine, where the fourth interface machine includes the target interface machine. The selector corresponding to the fourth interface machine sends the mixed audio data stream to the fourth interface machine, and the fourth interface machine forwards the mixed audio data stream to another interface machine in a device group in which the fourth interface machine is located.

The mixer and the selector are deployed by SET. To minimize the delay, the mixer and the selector of a SET are deployed in the same available area (the transmission delay within the available area can be controlled at 2 ms). In addition, audio data streams of the same conference will be processed in one SET, and eventually will be mixed in the same mixer.

Figure 7:
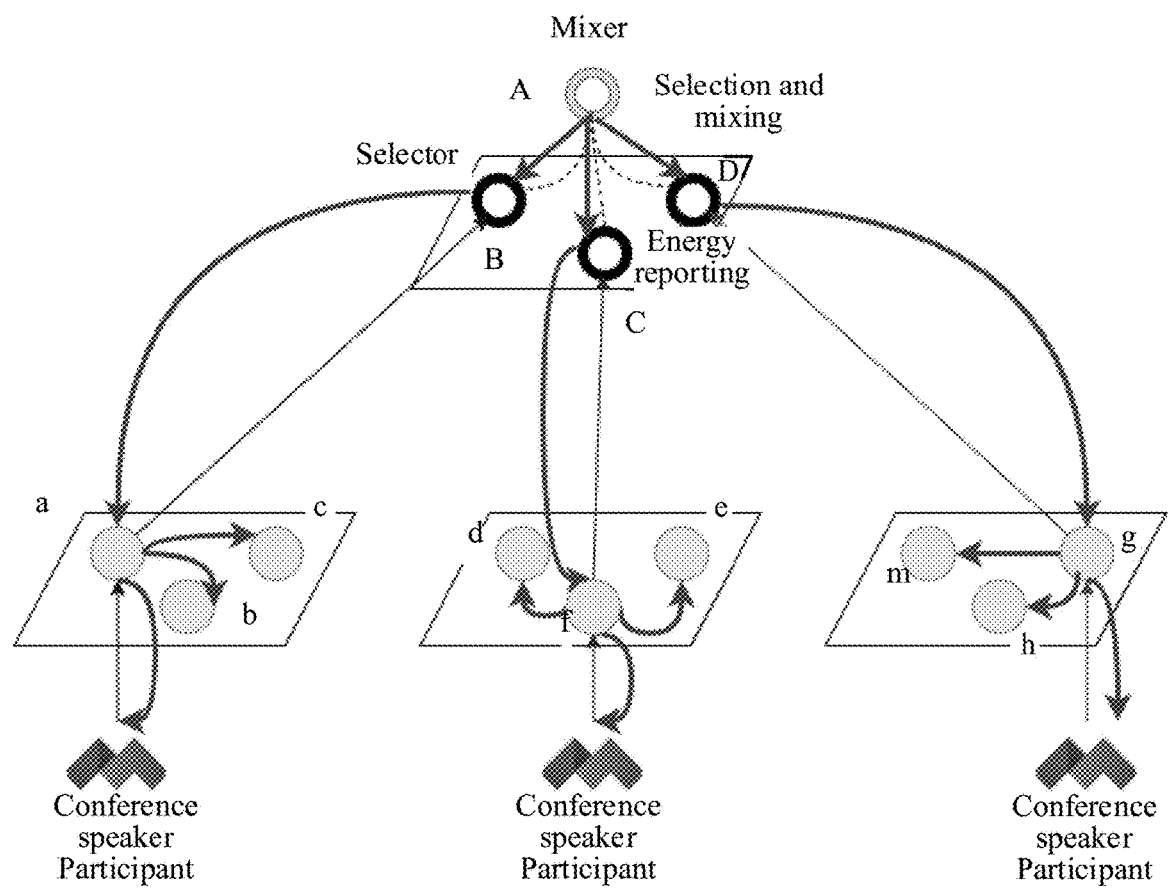
FIG. 7 is a diagram of an audio processing architecture based on a mixer engine according to an embodiment of this application.

It is assumed that FIG. 7 represents a real conference, where three participants enable the microphone. Interface machines to which the three participants belong are a node a, a node f, and a node g, and all other interface machines are audiences. To simplify the example diagram, it is assumed that two audio data streams are selected for each conference (generally, four to six audio data streams are selected for a real conference). In this case, a processing procedure of the audio data stream is as follows:

The node a, the node f, and the node g request a selector from the scheduling system in FIG. 6 (to minimize the delay, the scheduling system allocates selectors in the same available area to audio data streams in the same conference room), and respectively obtain selectors represented by a node B, a node C, and a node D in FIG. 7. The node a, the node f, and the node g forward the audio data streams to respective corresponding nodes B, C, and D. The node B, the node C, and the node D cache the uplink audio data streams, and report energy values to the mixer. The mixer sorts the energy values, selects two audio data streams from the node f and the node g as target audio data streams, and then notifies the node C and the node D, where the node C and the node D are used as target interface machines. After receiving the selection notification, the node C and the node D forward the corresponding target audio data streams to the mixer (the two steps have a delay within 5 ms). The mixer mixes the received target audio data streams, and then forwards the mixed audio data stream to the node B, the node C, and the node D. The node B, the node C, and the node D send the mixed audio data stream to the node a, the node f, and the node g. The nodes a, the node f, and the node g then perform SET internal forwarding.

The stream to be sent to the guest is different from the stream to the general audience. The mixed audio data stream to the guest needs to rule out the audio data stream from the guest. Therefore, the selected interface machine receives two audio data streams. One audio data stream is forwarded to the speaker, and the other audio data stream is forwarded to the audience in the SET.

The mixer engine 303 is a real-time media processing system, because audio data streams processed by the mixer engine 303 need to be forwarded to all participants in the conference room in real time. In many cases, an asynchronous stream processing system may be further required, that is, after the system obtains the audio data stream, the system does not need to send the audio data stream back to a participant in a conference room, but uses it for another purpose (for example, recording, porn detecting, and live streaming push). Therefore, the system generally does not need to be used in real time. Based on this, referring to FIG. 3, the audio and video conference system provided in one embodiment further includes a bypass media processing system 304. The bypass media processing system 304 is configured to pull, by using a robot terminal, a media data stream generated in a conference room, and process the media data stream. Referring to FIG. 3, the robot terminal includes a live stream robot, a record robot, and an MRA robot.

In this embodiment, a robot terminal is used for entering a conference room to pull a stream to implement a bypass media processing function. Recording is used as an example. A user service background starts a recording task in an application programming interface (API), and a recording task system instantiates a record robot to simulate a participant to enter a conference. The record robot pulls the media data stream in the conference to the local place, mixes and transcodes the stream, and records it. After the conference ends, the record robot uploads a recorded file to specified storage (or periodically uploads segments of the recorded file).

The solutions of porn detecting and live streaming push are similar to recording, and the difference lies only in service logic. During the interconnection with a third-party conference device, two-way communication is required, which is slightly different from the recording solution.

Figure 8:
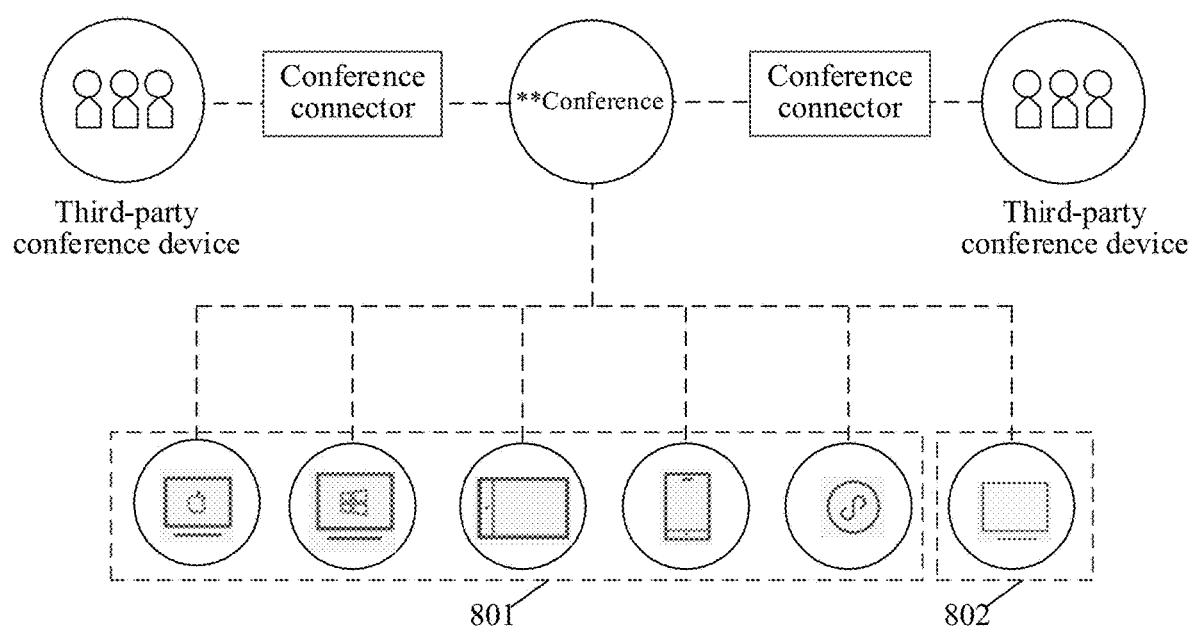
FIG. 8 is an architectural diagram of interconnection with a third-party conference device according to an embodiment of this application.

During the interconnection with a third-party conference device, referring to FIG. 8, a user service background starts an MRA (conference connector) robot. The MRA robot enters a conference  (in this case, other participants can see this MRA robot), and the MRA robot is connected to the third-party conference device by using a connection protocol (such as the SIP or H323 protocol). After pulling all media data streams in the conference  to the local place and mixing the streams, the MRA robot forwards them to the third-party conference device through the connection protocol. The MRA robot converts the media data stream from the third-party conference device into the private protocol of the conference  and forwards it to other participants in the conference room through the media transmission network. In FIG. 8, 801 is a mobile conference terminal, and 802 is a conference room intelligent conference room  for accessing the conference **.

Figure 9:
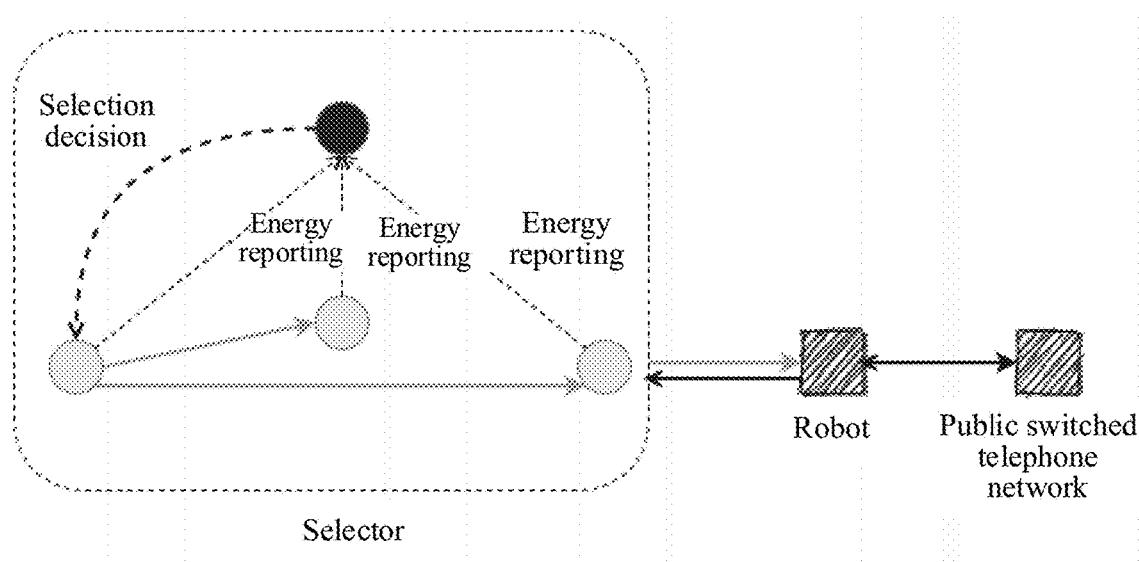
FIG. 9 is a diagram of still another audio processing architecture according to an embodiment of this application.

If the audio and video conference system does not introduce a mixer engine, the architecture shown in FIG. 9 may further be used for implementing interconnection between the data transmission network 301 and the public switched telephone network 305. That is, the function of the mixer engine is implemented by using a selector and a robot involved in a bypass media processing system. The selector performs selection based on reported energy and a corresponding selection decision.

Figure 10:
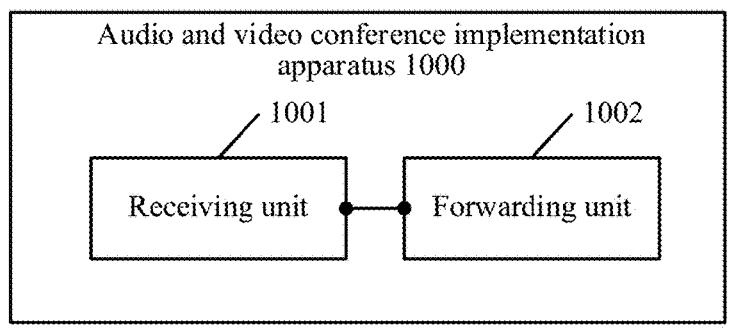
FIG. 10 is a structural diagram of an audio and video conference implementation apparatus according to an embodiment of this application.

Based on the foregoing provided audio and video conference implementation method, an embodiment of this application further provides an audio and video conference implementation apparatus. Referring to FIG. 10, the apparatus 1000 includes a receiving unit 1001 and a forwarding unit 1002:

the receiving unit 1001 being configured to receive an application to pull data stream from a first interface machine in a first device group, the application to pull data stream including first identification information of a media data stream, the first device group being any device group in multiple device groups, a retrieval device existing in each device group in the multiple device groups, each device group including multiple interface machines, and each interface machine in the multiple interface machines being configured to connect to a conference access terminal, so that the conference access terminal accesses a conference room by using the interface machine; the first interface machine being any interface machine in the first device group; and the forwarding unit 1002 being configured to forward the media data stream corresponding to the first identification information to the first interface machine, so that the first interface machine forwards the media data stream to a corresponding conference access terminal; and the media data stream being obtained by the retrieval device in the first device group from a second interface machine in a second device group, a conference access terminal that generates the media data stream accessing the conference room by using the second interface machine, and the second device group being any device group in the multiple device groups.

In one embodiment, the forwarding unit 1002 is configured to:

search for a media data stream of the corresponding second interface machine according to the first identification information; and forward the application to pull data stream to the second interface machine when the media data stream of the second interface machine is not found;

the receiving unit 1001 is further configured to receive the media data stream forwarded by the second interface machine according to the first identification information in the application to pull data stream; and the forwarding unit 1002 is further configured to forward the media data stream to the first interface machine.

In one embodiment, the forwarding unit 1002 is further configured to:

forward the media data stream to the first interface machine when the media data stream of the corresponding second interface machine is found.

In one embodiment, if the first device group and the second device group are located in different local area networks, the forwarding unit 1002 is configured to:

forward the application to pull data stream to the second interface machine by using a transit agent device; and receive, by using the transit agent device, the media data stream forwarded by the second interface machine.

In one embodiment, the retrieval device in the first device group is determined by the first interface machine according to a preset rule, and the preset rule causes a same media data stream to be routed, by using a same retrieval device, to an interface machine in a device group in which the retrieval device is located.

In one embodiment, the apparatus further includes a sending unit, a recording unit, and a returning unit:

the receiving unit 1001 is further configured to: receive, when a third interface machine in the third device group requests to enter the conference room, a registration request sent by the third interface machine, the third device group being any device group in the multiple device groups, and the third interface machine being any interface machine in the third device group;

the sending unit is configured to: send the registration request to a central server when information about the conference room is not found locally, so that the central server records second identification information of the intra-group server in the third device group to a first conference registration list, and returns registration success information to the intra-group server in the third device group;

the recording unit is configured to record third identification information of the third interface machine to a second conference registration list; and the returning unit is configured to return registration success information to the third interface machine.

In one embodiment, if the information about the conference room is locally found, the recording unit is further configured to record the third identification information of the third interface machine to the second conference registration list; and the returning unit is further configured to return registration success information to the third interface machine.

In one embodiment, the receiving unit 1001 is further configured to receive, when a status of a conference access terminal connected to the third interface machine in the third device group changes, a notification message sent by the third interface machine; and the sending unit is configured to send the notification message to the central server, so that the central server sends the notification message to an intra-group server in each device group, the intra-group server in each device group being configured to send the notification message to a successfully registered interface machine.

In one embodiment, the receiving unit 1001 is further configured to receive a list pull request of the third interface machine when the third interface machine in the third device group requests to pull a participant list;

the sending unit is configured to: send the list pull request to the central server when the participant list is not found locally;

the receiving unit 1001 is further configured to receive the participant list sent by the central server; and the sending unit is configured to send the participant list to the third interface machine.

In one embodiment, the sending unit is further configured to: return the participant list to the third interface machine when the participant list is found locally, and the participant list does not expire.

In one embodiment, the apparatus further includes a selection unit and a mixing unit:

the sending unit is further configured to: send, when the media data stream includes an audio data stream, acquired multiple audio data streams to a mixer located in a same device group by using a selector in a mixer engine, the multiple audio data streams respectively coming from fourth interface machines in different device groups;

the selection unit is configured to select a target audio data stream from the multiple audio data streams by using the mixer;

the sending unit is configured to send a selection notification to a target interface machine, the target interface machine being an interface machine connected to a conference access terminal that generates the target audio data stream;

the receiving unit 1001 is further configured to receive, by using the mixer, the target audio data stream sent by the target interface machine;

the mixing unit is configured to mix the target audio data stream;

the forwarding unit 1002 is further configured to forward the mixed audio data stream to a selector corresponding to the fourth interface machine; the fourth interface machine including the target interface machine; and the sending unit is further configured to send the mixed audio data stream to the fourth interface machine by using the selector corresponding to the fourth interface machine, so that the fourth interface machine forwards the mixed audio data stream to another interface machine in a device group in which the fourth interface machine is located.

In one embodiment, the apparatus further includes a processing unit:

the processing unit is configured to: pull, by using a robot terminal, a media data stream generated in the conference room, and process the media data stream.

An embodiment of this application further provides an electronic device for implementing an audio and video conference. The electronic device may be a terminal, and the terminal is a smartphone for example.

Figure 11:
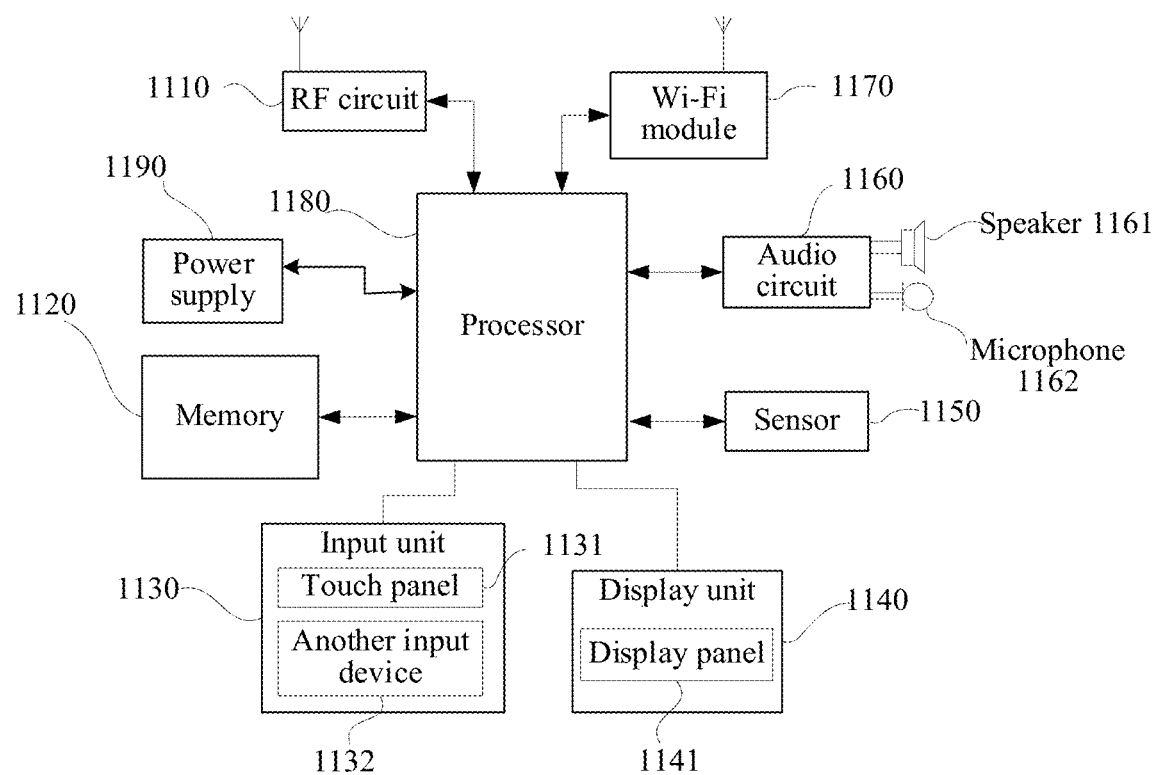
FIG. 11 is a structural diagram of a terminal according to an embodiment of this application.

FIG. 11 is a block diagram of a partial structure of a smartphone related to a terminal according to an embodiment of this application. Referring to FIG. 11, the smartphone includes: a radio frequency (RF) circuit 1110, a memory 1120, an input unit 1130, a display unit 1140, a sensor 1150, an audio circuit 1160, a wireless fidelity (Wi-Fi) module 1170, a processor 1180, a power supply 1190, and the like. The input unit 1130 may include a touch panel 1131 and another input device 1132, the display unit 1140 may include a display panel 1141, and the audio circuit 1160 may include a speaker 1161 and a microphone 1162. A person skilled in the art may understand that the structure of the smartphone shown in FIG. 11 does not constitute a limitation on the smartphone, and the smartphone may include more components or fewer components than those shown in the figure, or some components may be combined, or a different component deployment may be used.

Memory 1120 may be configured to store a software program and module processor 1180 runs the software program and module stored in memory 1120, to implement various functional applications and data processing of the smartphone. Memory 1120 may mainly include a program storage area and a data storage area. The program storage area may store an operating system, an application program required by at least one function (for example, a sound playing function and an image playing function), or the like. The data storage area may store data (such as audio data and an address book) created according to use of the smartphone. In addition, memory 1120 may include a high speed random access memory, and may also include a non-volatile memory, such as at least one magnetic disk storage device, a flash memory, or another volatile solid-state storage device.

The processor 1180 is a control center of the smartphone, and is connected to various parts of the entire smartphone by using various interfaces and lines. By running or executing a software program and/or module stored in the memory 1120, and invoking data stored in the memory 1120, the processor 1180 executes various functions of the smartphone and performs data processing, thereby monitoring the entire smartphone. In some embodiments, processor 1180 may include one or more processing units. Preferably, processor 1180 may integrate an application processor and a modem. The application processor mainly processes an operating system, a user interface, an application program, and the like. The modem mainly processes wireless communication. It may be understood that the foregoing modem may not be integrated into the processor 1180.

Figure 2:
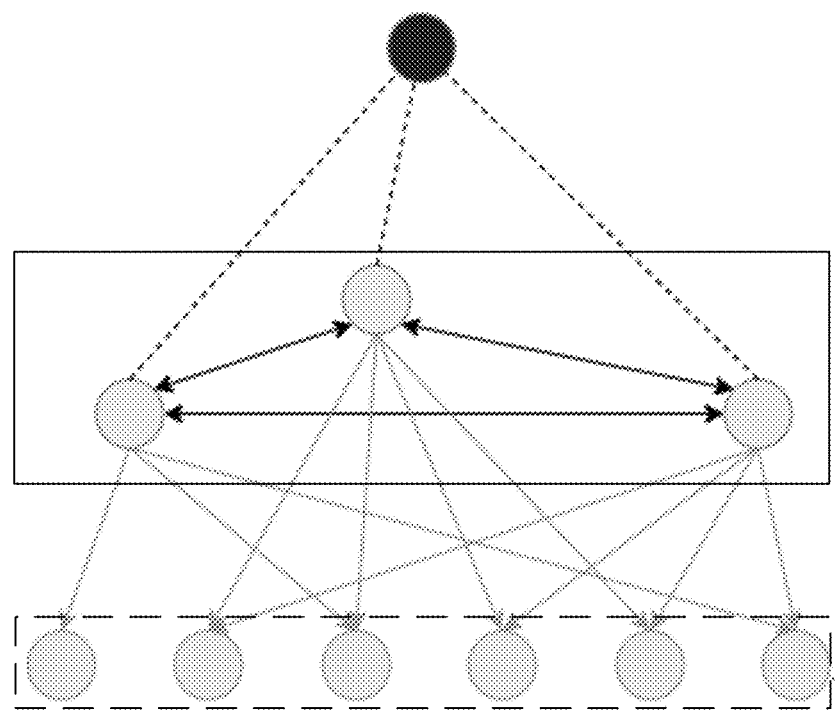
FIG. 2 is a diagram of another SFU-based conference architecture according to a related art.

In this embodiment, the steps performed by the terminal in the foregoing embodiment may be implemented based on the structure shown in FIG. 2.

Figure 12:
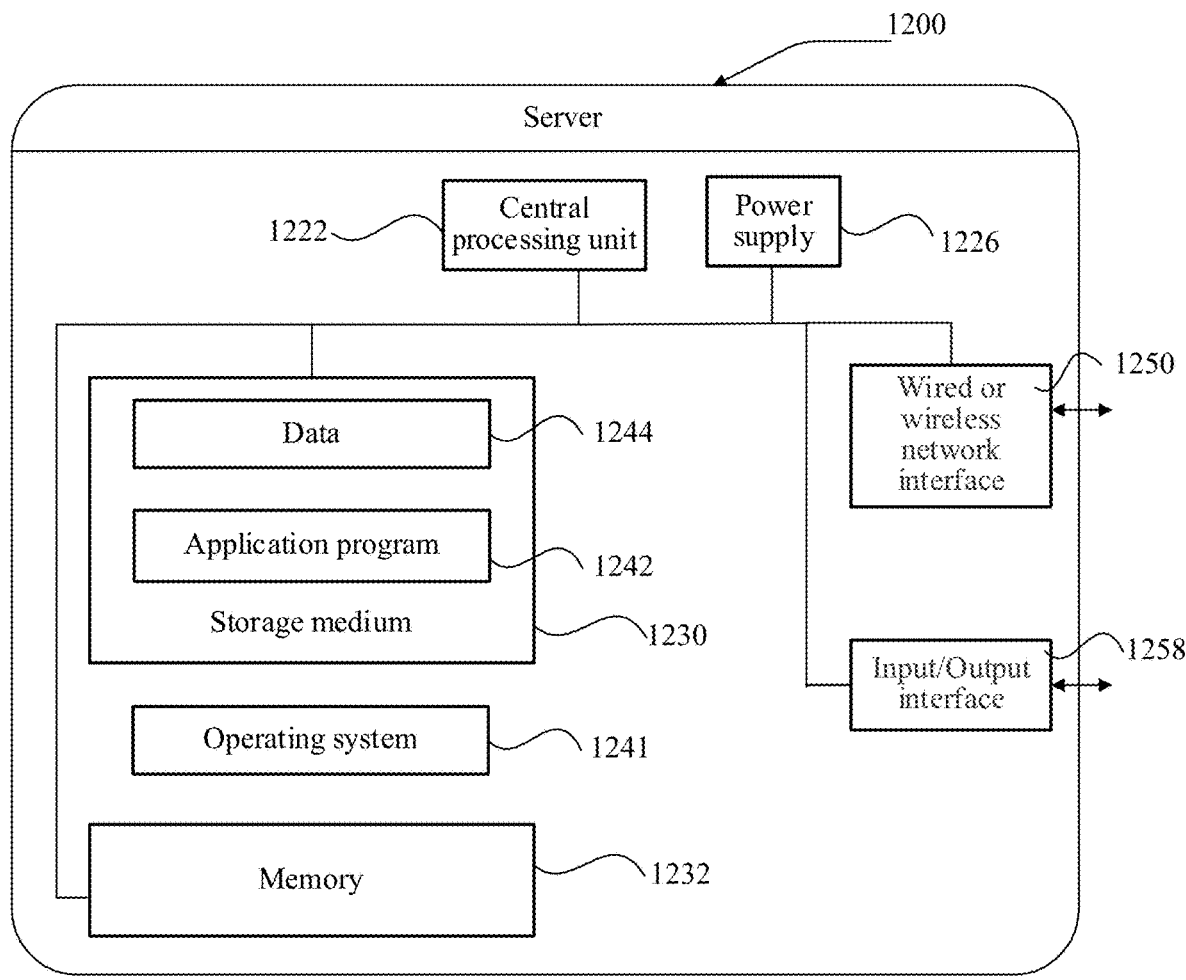
FIG. 12 is a structural diagram of a server according to an embodiment of this application.

The electronic device may further include a server. As shown in FIG. 12, an embodiment of this application further provides a server. Referring to FIG. 12, FIG. 12 is a structural diagram of a server 1200 according to an embodiment of this application. The server 1200 may vary greatly according to configuration or performance, and may include one or more central processing units (CPU) 1222 (for example, one or more processors) and a memory 1232, and one or more storage media 1230 (for example, one or more massive storage devices) storing an application program 1242 or data 1244. The memory 1232 and the storage medium 1230 may be used for transient storage or permanent storage. A program stored in storage medium 1230 may include one or more modules (which are not marked in the figure), and each module may include a series of instruction operations on the server. Still further, the central processing unit 1222 may be configured to communicate with the storage medium 1230, and execute a series of instruction operations in the storage medium 1230 on the server 1200.

The server 1200 may further include one or more power supplies 1226, one or more wired or wireless network interfaces 1250, one or more input/output interfaces 1258, and/or one or more operating systems 1241, such as Windows Server™, Mac OS X™, Unix™, Linux™, and FreeBSD™.

In this embodiment, the central processing unit 1222 in the server 1200 may perform the following steps:

receiving an application to pull data stream from a first interface machine in a first device group, the application to pull data stream including first identification information of a media data stream, the first device group being any device group in multiple device groups, a retrieval device existing in each device group in the multiple device groups, each device group including multiple interface machines, and each interface machine in the multiple interface machines being configured to connect to a conference access terminal, so that the conference access terminal accesses a conference room by using the interface machine; the first interface machine being any interface machine in the first device group; and forwarding the media data stream corresponding to the first identification information to the first interface machine, so that the first interface machine forwards the media data stream to a corresponding conference access terminal; and the media data stream being obtained by the retrieval device in the first device group from a second interface machine in a second device group, a conference access terminal that generates the media data stream accessing the conference room by using the second interface machine, and the second device group being any device group in the multiple device groups.

According to an aspect of this application, a computer readable storage medium is provided, where the computer readable storage medium is configured to store program code, and when the program code runs on an electronic device, the electronic device performs the method for implementing audio and video conference described in the foregoing embodiments.

An aspect of this application provides a computer program product or a computer program, the computer program product or the computer program including computer instructions, the computer instructions being stored in a computer readable storage medium. A processor of an electronic device reads the computer instructions from the computer readable storage medium, and the processor executes the computer instructions, so that the electronic device performs the method provided in the foregoing implementations of the embodiments.

In the specification and accompanying drawings of this application, the terms "first", "second", "third", "fourth", and so on (if existing) are intended to distinguish between similar objects rather than describe a specific order or sequence. It is to be understood that the terms used in such a way are interchangeable in a proper circumstance, so that the embodiments of this application described herein can be implemented in orders except the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In the embodiments provided in this application, it is to be understood that the disclosed system, apparatus, and method may be implemented in other manners. For example, the described apparatus embodiment is merely an example. For example, the unit division is merely a logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely used for describing the technical solutions of this application, but are not intended to impose limitations thereto. Although this application is described in detail with reference to the foregoing embodiments, a person of ordinary skill in the art shall understand that: modifications may still be made to the technical solutions described in the foregoing embodiments, or equivalent replacements may be made to the part of the technical features; However, these modifications or replacements do not depart the essence of the corresponding technical solutions from the spirit and scope of the technical solutions in the embodiments of this application.

What is claimed is:

1. A method for implementing audio and video conference in a audio and video conference system, the audio and video conference system comprising a data transmission network and a room management subsystem, the method comprising:
   receiving, by a retrieval device in a first device group, an application to pull data stream from a first interface machine in the first device group, the application to pull data stream comprising first identification information of a media data stream, the first device group being a device group in multiple device groups of the data transmission network, the data transmission network being configured to transmit the media data stream generated in a conference room, a retrieval device existing in each device group, each device group comprising multiple interface machines, and each interface machine being configured to connect to a conference accessing terminal that accesses the conference room by using the interface machine; the first interface machine being in the first device group, wherein the room management subsystem comprises the multiple device groups and a central server, each device group comprising an intra-group server, and the intra-group server being configured to assist the central server in managing the conference room; and
   forwarding, by the retrieval device in the first device group, the media data stream corresponding to the first identification information to the first interface machine, the first interface machine forwarding the media data stream to the conference accessing terminal; the media data stream being obtained by the retrieval device in the first device group from a second interface machine in a second device group, a data generating terminal that generates the media data stream accessing the conference room by using the second interface machine, and the second device group being a device group in the multiple device groups.

2. The method according to claim 1, wherein the forwarding, by the retrieval device in the first device group, the media data stream corresponding to the first identification information to the first interface machine comprises:
   searching for a media data stream of the corresponding second interface machine according to the first identification information;
   forwarding the application to pull data stream to the second interface machine when the media data stream of the second interface machine is not found; and
   receiving the media data stream forwarded by the second interface machine according to the first identification information in the application to pull data stream, and forwarding the media data stream to the first interface machine.

3. The method according to claim 2, wherein the method further comprises:
   forwarding the media data stream to the first interface machine when the media data stream of the corresponding second interface machine is found.

4. The method according to claim 2, wherein when the first device group and the second device group are located in different local area networks, the forwarding the application to pull data stream to the second interface machine comprises:

forwarding the application to pull data stream to the second interface machine by using a transit agent device; and the receiving the media data stream forwarded by the second interface machine according to the first identification information in the application to pull data stream comprises:

receiving, by using the transit agent device, the media data stream forwarded by the second interface machine.

5. The method according to claim 1, wherein the retrieval device in the first device group is determined by the first interface machine according to a rule that causes devices in the first device group to find the same retrieval device, wherein the application to pull data stream of the devices in the first device group is sent to the same retrieval device.

6. The method according to claim 5, wherein the rule comprises a consistent hash method.

7. The method according to claim 1, wherein the method further comprises:

receiving, by an intra-group server in a third device group when a third interface machine in the third device group requests to enter the conference room, a registration request sent by the third interface machine, the third device group being a device group in the multiple device groups, and the third interface machine being an interface machine in the third device group;

sending the registration request to a central server when the intra-group server in the third device group does not locally find information about the conference room, the central server recording second identification information of the intra-group server in the third device group to a first conference registration list, and returns registration success information to the intra-group server in the third device group; and recording, by the intra-group server in the third device group, third identification information of the third interface machine into a second conference registration list, and returning the registration success information to the third interface machine.

8. The method according to claim 7, wherein the method further comprises:

recording the third identification information of the third interface machine into the second conference registration list when the intra-group server in the third device group locally finds the information about the conference room, and returning the registration success information to the third interface machine.

9. The method according to claim 7, wherein the method further comprises:

receiving, by the intra-group server in the third device group when a status of a data accessing terminal connected to the third interface machine in the third device group changes, a notification message sent by the third interface machine; and sending, by the intra-group server in the third device group, the notification message to the central server, the central server sending the notification message to an intra-group server in each device group, the intra-group server in each device group being configured to send the notification message to a successfully registered interface machine.

10. The method according to claim 7, wherein the method further comprises:

receiving, by the intra-group server in the third device group, a list pull request of the third interface machine when the third interface machine in the third device group requests to pull a participant list;

sending the list pull request to the central server when the intra-group server in the third device group does not find the participant list locally; and receiving, by the intra-group server in the third device group, the participant list sent by the central server, and sending the participant list to the third interface machine.

11. The method according to claim 7, wherein the method further comprises:

returning the participant list to the third interface machine when the intra-group server in the third device group locally finds the participant list, and the participant list does not expire.

12. The method according to claim 1, wherein the method further comprises:

sending, when the media data stream comprises an audio data stream, acquired multiple audio data streams to a mixer located in a same device group by using a selector in a mixer engine, the multiple audio data streams respectively coming from fourth interface machines in different device groups;

selecting a target audio data stream from the multiple audio data streams by using the mixer, and sending a selection notification to a target interface machine, the target interface machine being an interface machine connected to a data accessing terminal that generates the target audio data stream;

receiving, by using the mixer, a target audio data stream sent by the target interface machine, and mixing the target audio data stream;

forwarding the mixed audio data stream to a selector corresponding to the fourth interface machine; the fourth interface machine comprising the target interface machine; and sending the mixed audio data stream to the fourth interface machine by using the selector corresponding to the fourth interface machine, the fourth interface machine forwarding the mixed audio data stream to another interface machine in a device group in which the fourth interface machine is located.

13. The method according to claim 1, wherein the method further comprises:

pulling, by using a robot terminal, a media data stream generated in the conference room, and processing the media data stream.

14. The method according to claim 1, wherein:

the intra-group server is configured to synchronize a notification message of a status change and pull a participant list in the device group;

the multiple interface machines of the first device group are registered to the same intra-group server; and the intra-group server and the retrieval device in the first device group are different devices.

15. An audio and video conference system, comprising a data transmission network and a room management subsystem, wherein:

the data transmission network being configured to transmit a media data stream generated in a conference room, the data transmission network comprising multiple device groups, and each device group comprising multiple interface machines;

each of the multiple interface machines being configured to connect to a conference accessing terminal, the conference access terminal accessing the conference room by using the interface machine;

a retrieval device existing in each device group in the multiple device groups, a retrieval device in a first device group being configured to receive an application to pull data stream from a first interface machine in the first device group, the application to pull data stream comprising first identification information of a media data stream, and forward the media data stream corresponding to the first identification information to the first interface machine, the media data stream being obtained by the retrieval device in the first device group from a second interface machine in a second device group, a data generating terminal that generates the media data stream accessing the conference room by using the second interface machine, and the first device group and the second device group each being any one of the multiple device groups;

the first interface machine being an interface machine in the first device group, and the first interface machine being configured to forward the media data stream to a corresponding conference access terminal; and the room management subsystem comprising the multiple device groups and a central server, each device group comprising an intra-group server, and the intra-group server being configured to assist the central server in managing the conference room.

16. The audio and video conference system according to claim 15, wherein the first device group is further configured to perform:

searching for a media data stream of the corresponding second interface machine according to the first identification information;

forwarding the application to pull data stream to the second interface machine when the media data stream of the second interface machine is not found; and receiving the media data stream forwarded by the second interface machine according to the first identification information in the application to pull data stream, and forwarding the media data stream to the first interface machine.

17. The audio and video conference system according to claim 16, wherein the first device group is further configured to perform:

forwarding the media data stream to the first interface machine when the media data stream of the corresponding second interface machine is found.

18. The audio and video conference system according to claim 16, wherein when the first device group and the second device group are located in different local area networks, the forwarding the application to pull data stream to the second interface machine comprises:

forwarding the application to pull data stream to the second interface machine by using a transit agent device; and the receiving the media data stream forwarded by the second interface machine according to the first identification information in the application to pull data stream comprises:

receiving, by using the transit agent device, the media data stream forwarded by the second interface machine.

19. A non-transitory computer readable storage medium, configured to store computer program code, when running on a retrieval device in a first device group of an audio and video conference system, causing the retrieval device in the first device group to perform:

receiving, by the retrieval device in the first device group, an application to pull data stream from a first interface machine in the first device group, the application to pull data stream comprising first identification information of a media data stream, the audio and video conference system comprising a data transmission network and a room management subsystem, the first device group being a device group in multiple device groups of the data transmission network, the data transmission network being configured to transmit the media data stream generated in a conference room, a retrieval device existing in each device group, each device group comprising multiple interface machines, and each interface machine being configured to connect to a conference accessing terminal that accesses the conference room by using the interface machine; the first interface machine being in the first device group, wherein the room management subsystem comprises the multiple device groups and a central server, each device group comprising an intra-group server, and the intra-group server being configured to assist the central server in managing the conference room; and forwarding, by the retrieval device in the first device group, the media data stream corresponding to the first identification information to the first interface machine, the first interface machine forwarding the media data stream to the conference accessing terminal; the media data stream being obtained by the retrieval device in the first device group from a second interface machine in a second device group, a data generating terminal that generates the media data stream accessing the conference room by using the second interface machine, and the second device group being a device group in the multiple device groups.

20. The computer readable storage medium according to claim 19, wherein the forwarding, by the retrieval device in the first device group, the media data stream corresponding to the first identification information to the first interface machine comprises:

searching for a media data stream of the corresponding second interface machine according to the first identification information;

forwarding the application to pull data stream to the second interface machine when the media data stream of the second interface machine is not found; and receiving the media data stream forwarded by the second interface machine according to the first identification information in the application to pull data stream, and forwarding the media data stream to the first interface machine.

* * * * *